April 6, 1954     E. C. SIMMONS     2,674,060
FISH LURE
Filed July 20, 1951
Fig. 1.
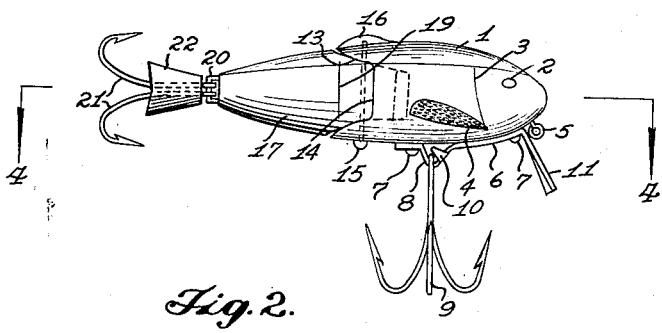
Fig. 2.
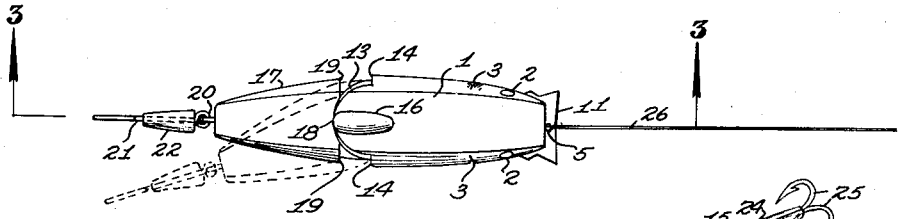
Fig. 3.     Fig. 5.
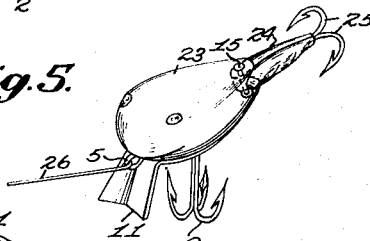
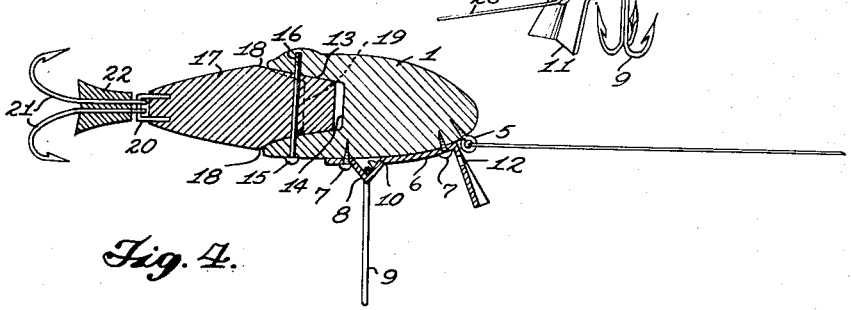
Fig. 4.
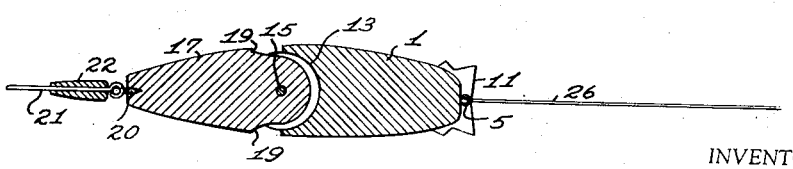
INVENTOR
EDMOND C. SIMMONS
BY
McMorrow, Berman + Davidson
ATTORNEYS

Patented Apr. 6, 1954

2,674,060

UNITED STATES PATENT OFFICE 2,674,060

FISH LURE

Edmond C. Simmons, Homer, Ky.

Application July 20, 1951, Serial No. 237,769

1 Claim. (Cl. 43—42.15)

This invention relates to fish lures. More particularly, the invention has reference to a fish lure of the jointed type.

One important object of the present invention is to provide a fish lure, as described, wherein the joining of the component parts of the lure will be effective to impart a more likelike and natural motion to the parts when the lure is drawn through the water.

Another important object is to provide a tail construction in a fish lure wherein the tail hooks of the lure will be so assembled with the tail fin thereof as to be seemingly a part of the tail of the lure and be moved from side to side jointly with the tail fin.

Referring to the drawings:

Figure 1 is a side elevational view of a fish lure formed in accordance with the invention;

Figure 2 is a top plan view, the dotted lines indicating one position to which the tail portion of the lure may move;

Figure 3 is a longitudinal sectional view taken substantially on line 3—3 of Figure 2;

Figure 4 is a longitudinal sectional view taken substantially on line 4—4 of Figure 1;

Figure 5 is a perspective view of a modified form in the simulation of a tadpole.

Referring to the drawings in detail, a head portion 1 is painted or molded with eyes 2, gills 3, and lateral fins 4, so as to simulate closely a minnow or other small fish. A screw eye 5 is threaded into or molded in the front end of the head portion, and upon the under side of the head portion and extended longitudinally thereof is an elongated plate 6 curved longitudinally and transversely in correspondence to the curvature of the head portion, said plate 6 being secured at spaced locations to said head portion by screws 7 or their equivalents.

Intermediate its opposite ends the plate 6 has a downwardly offset portion 8 receiving the eye of a depending bottom hook 9 that is swingably mounted upon said downwardly offset portion. Lugs 10 are formed upon opposite sides of the plate 6 and limit swinging of the bottom hook toward the front of the lure.

The plate 6 may be, and preferably is, formed at its front end with a downwardly inclined, diving fin or scoop 11 having a bubble hole 12.

The rear end of the head portion 1 is fashioned with an inwardly extending, tapered recess 13. The top and bottom edges of said recess, as seen from Figure 2, are curved or bowed toward the rear end of the lure, the ends of said curved top and bottom edges being connected by straight side edges 14 of the recess that extend vertically of opposite sides of the head portion 1.

A connecting pin 15 is inclined slightly from the vertical and extends through the medial portion of said recess. At its upper end the pin 15 is threaded, and a dorsal fin 16 is molded upon the top surface of the head portion, so as to anchor the connecting pin against any tendency thereof to loosen. The plate 6 in the present instance terminates short of the pin 15, but under some circumstances, it could be manufactured to extend rearwardly beyond the connecting pin, in which event it would have an opening through which the pin would extend for the purpose of providing a braced connection between the pin and head portion 1. It is believed that this construction would be sufficiently obvious to those skilled in the art as not to require special illustration.

A tapered tail portion 17 has a reduced front end loosely received in the recess of the head portion, and at the base of the reduced part a circumferential shoulder is formed on the tail portion, the shoulder having curved indentations 18 at the top and bottom of the tail portion receiving the curved top and bottom edges 13 of the aforementioned recess. At the sides of the tail portion the circumferential shoulder has straight portions 19 parallel to the vertical side edges 14.

The pin 15 extends through the reduced part of the tail portion, the tail portion being loosely and pivotally mounted upon the pin.

By reason of this arrangement, the tail portion of the lure is adapted to swing from side to side, as shown in the dotted lines in Figure 2, and in either direction in which it is swung, it will have a certain amount of upward movement, due to the angular positioning of the connecting pin 15. This side-to-side, wiggling movement of the tail portion, seemingly accompanied by an upward twitching action, is effective to simulate with a high degree of naturalness the movements of a minnow or other small bait fish as it swims through the water.

In this connection, this close simulation of a minnow's movements is accomplished wholly by the inclined positioning of the connecting pin 15, and the loose pivotal mounting of the tail portion upon said pin, whereby the resistance of the water encountered by the lure during movement therethrough acts upon the tail portion in such a manner as to make the wiggling and twitching movements just sufficiently erratic as to increase the faithfulness of the simulation of a minnow's movements.

Rigidly connected to the tapered rear end of the tail portion 17 is a staple 20 receiving the eyes of vertically spaced, horizontally extending hooks 21 molded in spaced relation in and coplanar with a tail fin 22.

Formation of the tail fin and hooks 21 in this manner is effective to form the projected, barbed parts of the hooks 21 into extensions of the tail fin 22, said hooks moving from side to side jointly with the tail fin.

Referring to Figure 5, a modified form of the invention is here illustrated, in which the lure is formed as a tadpole rather than as a minnow or other fish. A tapered head portion 23 is pivotally connected to a tail portion 24 in which are molded tail hooks 25. A connecting pin 15 similar to the pin of the first form of the invention connects the head and tail portions, and is inclined similarly to the first form of the invention. Additionally, the head and tail portions 23 and 24 are respectively recessed and shouldered in a manner identical to the first form of the invention, and the bottom plate having a scoop 11 is attached to the head portion 23, said bottom plate carrying the depending bottom hook 9.

In both forms of the invention, a leader 26 is connected in the usual manner to the eye 5.

What is claimed is:

A fish lure including a head portion having a recess at its rear end, said recess having rearwardly bowed top and bottom edges and vertical side edges; a tail portion having a reduced front part loosely positioned within the recess, the tail portion being formed with shoulders extending transversely of the base of said reduced part, the top and bottom surfaces of the tail portion being provided with curved indentations for receiving the top and bottom edges of the recess, said shoulders being disposed in planes parallel with the planes of said side edges, the shoulders being engageable by the side edges of the recess to limit side-to-side movement of the tail portion relative to the head portion of the lure; a dorsal fin molded on and projecting upwardly from the head portion contiguous to said top edge thereof to thicken the head portion adjacent said top edge; and a connecting pin mounted on the head portion within the recess, said pin being inclined from the vertical and extended loosely through the tail portion and having its upper end positioned forwardly of its lower end and anchored within said fin, whereby the tail portion may have a side-to-side wiggling and an erratic, upward twitching movement relative to the head portion.

References Cited in the file of this patent
UNITED STATES PATENTS

| Number | Name | Date |
| --- | --- | --- |
| 974,493 | Immell | Nov. 1, 1910 |
| 2,001,652 | Bird | May 14, 1935 |
| 2,065,337 | Lee | Dec. 22, 1936 |
| 2,429,339 | Arbogast | Oct. 21, 1947 |
| 2,503,620 | Larson | Apr. 11, 1950 |
| 2,535,392 | Dale | Dec. 26, 1950 |
| 2,565,099 | Simmons | Aug. 21, 1951 |